April 8, 1930.  T. BOSSARD  1,753,199
FUELING SYSTEM
Filed April 16, 1928  3 Sheets-Sheet 3
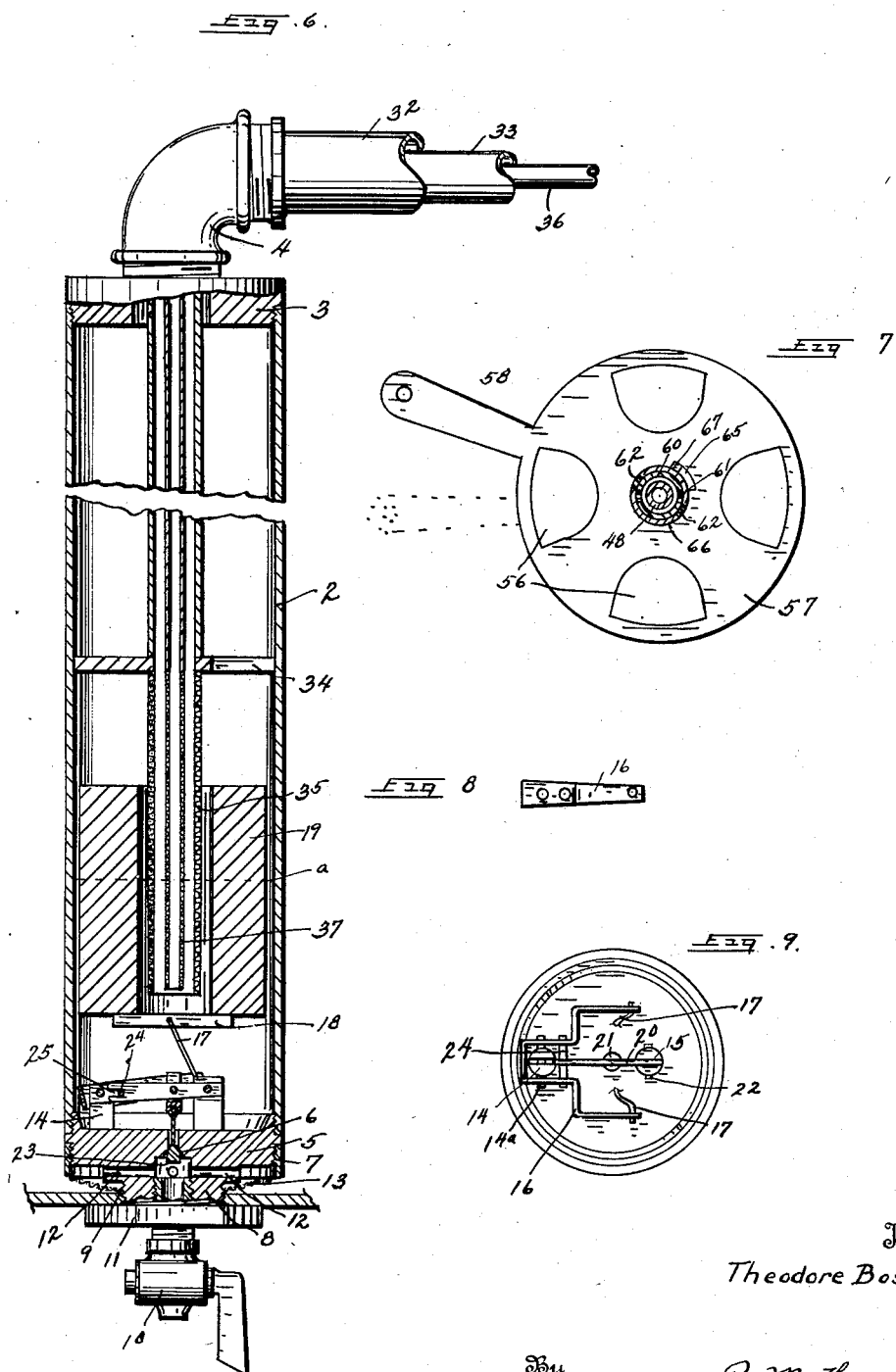
Inventor
Theodore Bossard
By R. M. Thomas
Attorney Patented Apr. 8, 1930

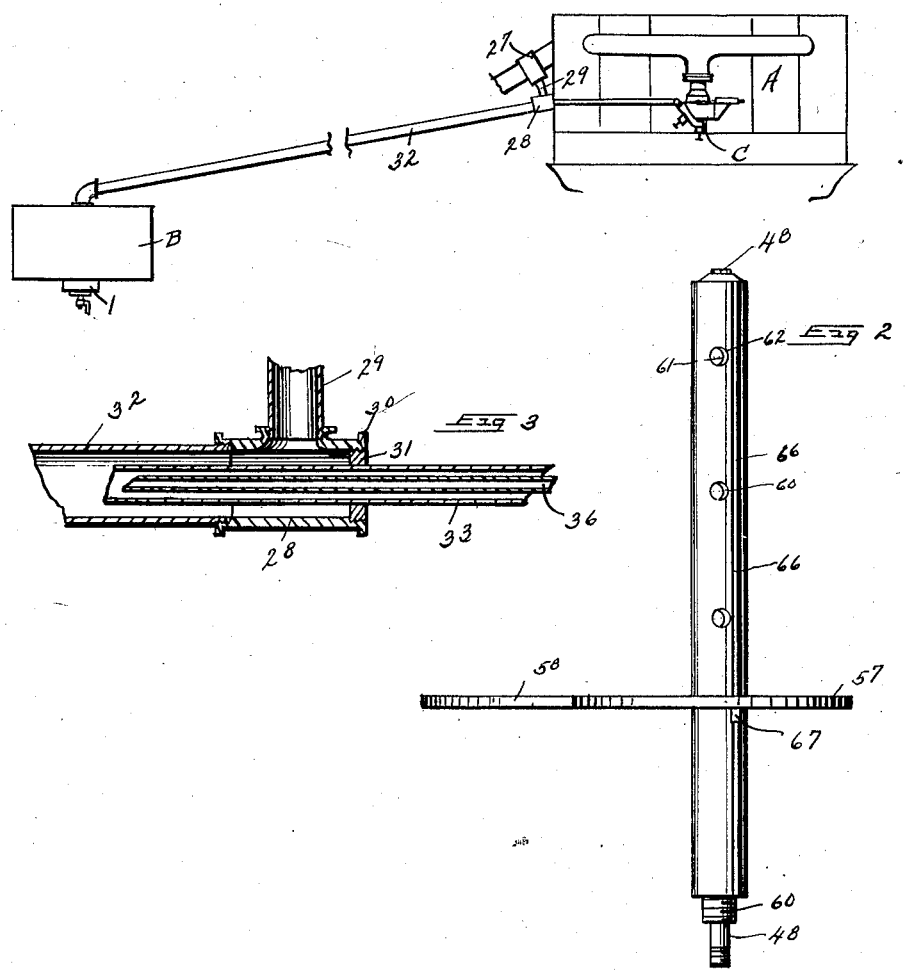

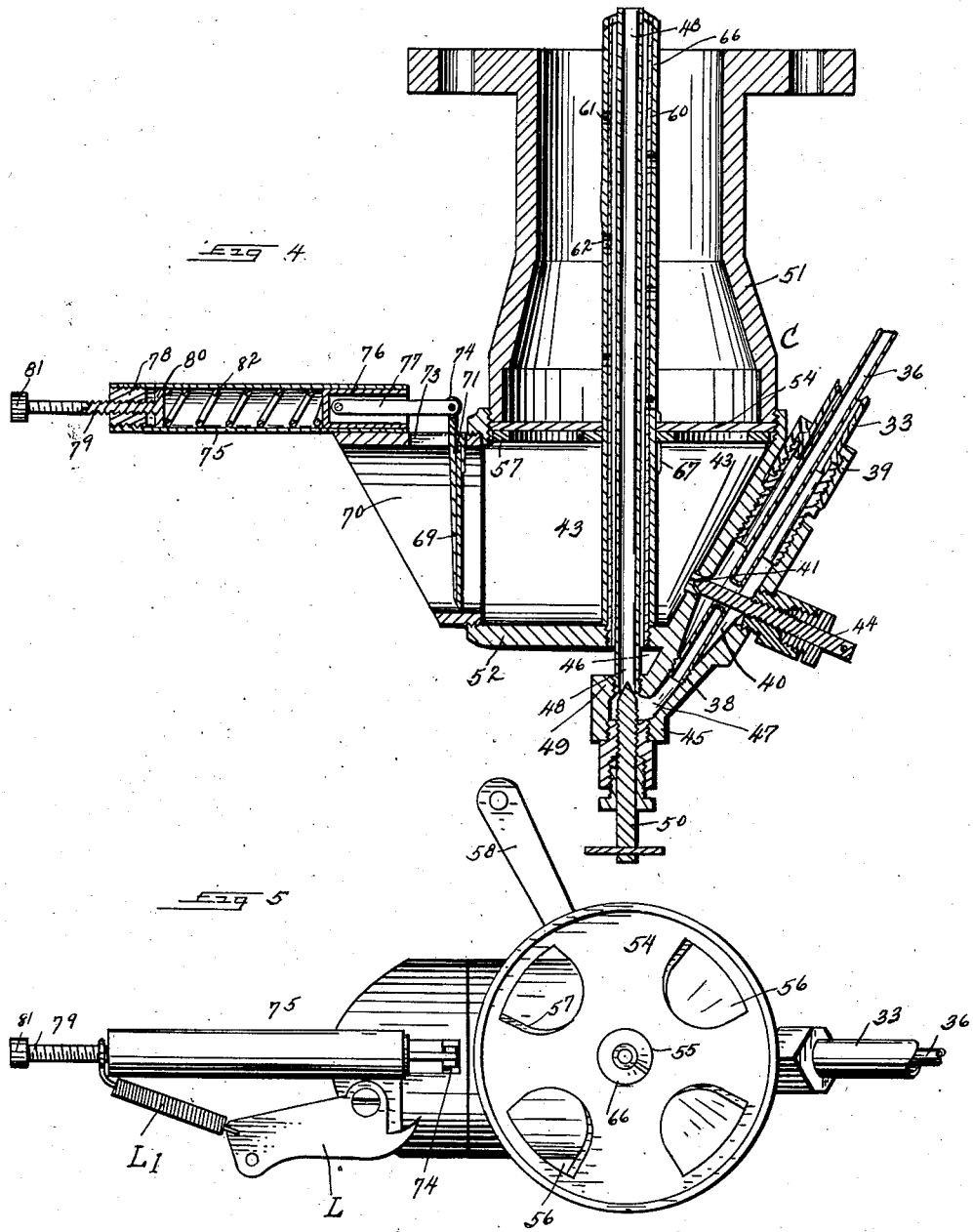

1,753,199

UNITED STATES PATENT OFFICE

THEODORE BOSSARD, OF SALT LAKE CITY, UTAH, ASSIGNOR TO BOSSARD PRODUCTS COMPANY, INC., A CORPORATION OF UTAH

FUELING SYSTEM

Application filed April 16, 1928. Serial No. 270,231.

My invention relates to fueling systems and has for its object to provide a new and efficient fueling system for supplying the gaseous fuel to the intake manifold of an internal combustion engine.

A further object is to provide a fueling system for internal combustion engines which will be easily installed, will be highly efficient and one which will eliminate the need of a vacuum tank to draw the gasoline from the supply tank to the carburetor.

A still further object is to provide a fueling system for internal combustion engines which will be installed partially in the gasoline tank and part at the intake manifold and which will, when so installed, take the place of both the carburetor and the vacuum tank or pump by which the gasoline is drawn to the carburetor and then broken up in the process of carburetion into gas for firing the engine.

A still further object is to provide a fueling system which will be so positive in its action that more mileage will be made from the gasoline than has heretofore been accomplished by the older methods and one in which there will be very few adjustments necessary for complete carburetion of the gasoline into gas.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a diagrammatic view of the device in connection with an intake manifold of an internal combustion engine and the supply tank. Figure 2 is a side elevation of the fuel mixing device used in the carburetion part of my invention. Figure 3 is a section of the three pipes showing the construction thereof. Figure 4 is a vertical section of the carburetion portion of my invention. Figure 5 is a plan view of the lower half of Figure 4. Figure 6 is a vertical section of the flat chamber of the invention. Figure 7 is a plan view of Figure 2. Figure 8 is a side view of one of the float actuated levers. Figure 9 is a plan view of the float chamber with the top, the pipes and the float removed.

In the drawings I have shown the engine of the automobile as A, and the supply tank as B. Adjacent one end of the said tank B, I provide a small protruding portion of the tank 1, through which I secure the cylindrical float chamber of my device. The carburetion portion C of my device is mounted on the intake manifold pipe similar to the usual method of mounting a carburetor. The float chamber is made of a tubular or cylindrical pipe 2, having a centrally perforated closure plug 3 in the top end thereof, in which perforation an elbow 4 is screwed. The lower end of the said pipe 2 is provided with a centrally bored plug 5, and the lower end of the said bore is formed into a valve seat 6. The lower end of the said plug is externally threaded at 7, and the extreme end 8 is made of smaller diameter and is externally threaded at 9 and internally threaded to receive a cock 10. The threaded portion 9 of the end 8 is passed through the bottom of the portion 1 of the tank and a nut 11 is screwed thereon to secure the entire float chamber within the tank. Radial holes 12 are bored through the upper part of the end 8 and are in open connection with the bore through the plug with the lower end of said bore of larger diameter than the upper end. The said radial holes are provided, to allow gas to flow therethrough into the bore of the plug 5. A screen 13 is screwed onto the external threads 7 of the plug 5 entirely covering the lower end of the cylinder so that all gasoline passing through the bore 5 is screened first through the screen 13. On the top side of the said plug 5, I provide two spaced apart bearing blocks 14 and 15. The said block 14 is transversely bored to receive a pivot pin 14ª on which a lever 16 is mounted. The said lever 16 has its ends bored to receive a wire 17 and the wire 17 is passed through a bar 18 on the lower side of the float 19. Another lever 20 is pivoted in a slot in the block 15 and a split stem 21 is pivoted to the said lever 20 by the pin 22, with said stem 21 passing downwardly through the bore 6 and having a valve 23 formed on the lower end thereof adapted to close the bore 6 when the lever 20 is raised. The said lever 20 is connected with the lever 16 by a cross bar 24. The said cross bar 24 is secured in the lever 16 and the end of the lever 20 is slotted or bifurcated at 25 to surround the bar but not to completely encompass it so that the bar can move longitudinally in the slot 25. The float 19 is of the usual type having the central portion thereof removed and with the general shape that of a cylinder. When the float is raised by the incoming gasoline it will raise the levers 16 and 20 and shut off the inflow of gasoline when it has reached the approximate height of the dotted line —a—.

The exhaust pipe of the automobile is then encircled by an air heater 27 and the said heater 27 is connected with a T joint 28 by a pipe 29. One end 30 of the T joint 28 is closed by a perforated plug 31 and the other end of the said joint is engaged with a pipe 32. The said pipe 32 is then connected with the elbow 4 so that air passing through the heater 27 passes through the pipe 29, the joint 28, the pipe 32 and into the top end of the cylinder float chamber 2. A pipe 33 of smaller diameter than the pipe 32 is then connected with the carburetor portion of my device at one side thereof and is then passed through the perforation in the plug 31 of the T joint 28 and leads down through the pipe 32 into the float chamber. The lower end of the said pipe 33 is supported by a bracket 34 and the extreme end of the said pipe is connected with a woven metal or wire screen 35, which screen is of sufficient length to go down through the float to within a short distance of the bottom of the float chamber and is so situated that the upper half portion of the screen is never under the gasoline level while the lower portion has some part covered with the liquid at all times. Another pipe 36 of smaller diameter than the pipe 33 is passed through the pipe 33 and has the lower end thereof made similar to the pipe 33 with a screen 37 on the lower end thereof and of the same length as the screen on the pipe 33. The other end of the pipe 36 is passed into the side of the carburetor portion of the device and screwed into the threads 38. The said pipe 33 is secured to the carburetor by the nut 39 and the end thereof is in open connection with a chamber 40, and the pipe 36 passes through the chamber 40 to where it is secured. A hole 41 is provided in one side of the chamber 40 connecting it with the mixing chamber 43 of the carburetion device, and a needle valve 44 is secured in the outer side of the chamber 40 to control the amount of fluid to pass through the hole 41. The said carburetion device C is made as shown in Figure 4 of the drawings and is provided with a boss 45 on the extreme lower end thereof with an air passage 46 cut partially therethrough. The said boss 45 is formed hollow making a chamber 47 therein, into which chamber the fluid passing through the pipe 36 is carried. An idling pipe 48 is then screwed into the side 49 of the boss in open connection with the chamber 47 and a needle valve 50 is provided to control the amount of fluid allowed to pass from the chamber 47 into the pipe 48. The said idling pipe 48 passes upwardly through the entire carburetion device C into the intake manifold of the engine. The said carburetion device is made in two portions 51 and 52, with the portion 51 having the top end thereof formed to engage with the lower end of the intake manifold of the engine, and with the lower end thereof externally threaded to screw into the portion 52. A partition 54 is secured between the two portions 51 and 52 and is perforated at 55 through which an upright pipe 66 is passed. Air ports 56 are cut around the side of the central perforation and an air control plate 57 is carried below the partition 54. The said plate 57 is provided with a lever 58 thereon which lever is passed through a slot in the side of the portion 52 and is adapted to partially rotate the plate as desired to regulate the speed of the engine acting as a throttle therefor, as the plate 57 has holes 59 therethrough adapted to be brought into alignment with the holes or ports 56 of the partition 54. The said upright pipe 66 surrounds another pipe 60, which pipe 60 is screwed into the lower side of the portion 52 of the carburetion device C and the lower end of the said pipe 60 is open to the air in the air passage 46. The idling pipe 48 is within the pipe 60 and passes through the entire length thereof and protrudes slightly above the upper end. The top end of the pipe 60 is closed and ports 61 are formed in the sides of the pipe 60 and other ports 62 are formed in the pipe 66 adapted to be brought into alignment with the port 61 when the outer pipe 66 is partially rotated. The said plate 57 is provided with a slot 65 partially around the pipe 66 and the lug 67 is secured on the side of the pipe 66 adapted to move the said slot 65 and to turn the pipe 66 when the plate 57 is rotated sufficiently for the lug to travel the length of the slot, so that the plate 57 rotates about half of its distance of movement before the pipe 66 rotates to bring the holes or ports 61 and 62 into alignment. An air control flap valve 69 is mounted in a cylindrical tube 70 and said tube 70 is screwed into one side of the portion 52. The said flap valve 69 is pivoted on a cross pin 71 and the upper end of the said valve is passed through a hole 73 in the tube 70 and is bifurcated at 74. A tubular cylinder 75 is secured on the top side of the tube 70 and a piston 76 is longitudinally carried therein, with a connecting rod 77 connecting the piston 76 with the bifurcated end 74 of the valve 69. The other end of the said cylinder 75 is internally threaded to receive a plug 78 and the plug 78 is bored and threaded to receive an adjustment rod 79. One end of the said rod 79 is enlarged as a head 80 and the other end 81 is enlarged and knurled to make a hand hold thereon. A spring 82 is carried within the cylinder 75 between the head 80 and the inner side of the piston 76 and the tension of the spring is regulated by the screwing in or out of the rod 79. The choke lever L is mounted on the tube 70 and when actuated, stops the movement of the lever 69. A spring L¹ controls the lever L when not in use.

The operation of my fuel system is as follows:

When installed in the tank of an automobile and with the carburetion member C secured to the intake manifold of the automobile the air heater is attached and the device is ready for operation. The rotation of the engine developes suction in the intake manifold and draws the air from the pipe 48 and its connecting pipe 36, this action draws air through the screen 37 in the float chamber 2 and as air is drawn through the screen it also takes up gasoline vapors from the screen and the surface of the gasoline in the chamber 2, this gasoline vapor starts the automobile. If the weather is cold the choke lever L is pulled which holds the valve 69 from opening thereby giving a richer mixture to the engine. When the engine is running and it is desired to accelerate the motor, the throttle plate 57 is turned by the lever 58 and more air is allowed to be drawn up through the manifold through the ports 56 and 57 to the engine, this suction draws the air out through the hole 41 in the chamber 42 and draws the air from the pipe 33 and through the screen 35, and as it passes through the screen 35 it takes up gas vapors from the screen and carries them through the pipe 33 and into the intake manifold of the engine. As the throttle is opened the air is drawn through the carburetion device in such a force as to open the valve 69, compressing the spring 82. As the plate 57 is turned sufficiently the air ports in the pipe 60 come into alignment and air is drawn up through the pipe 60 and through the ports 61 and 62 atomizing and breaking up the volume of air and gasoline passing up through the portion 51 of the carburetion device, making a more complete mixture of the vapors thereby insuring better operation of the motor at a cheaper cost per mile. As will be seen the plate 57 will not open or rotate the pipe 66 until it has moved part way in its rotation and the same is true when closing the plate does not turn the pipe 66 until it has moved part way in its path of travel. The air which is drawn into the intake manifold is the air which is preheated around the exhaust manifold and is drawn through the T joint 28, and the pipe 32 into the float chamber 2, where it is drawn through the screens to pick up the vapors and carry them to the engine. The construction also heats the gas vapors passing through the pipes 33 and 36 as they are enclosed within the pipe 32 up to a short distance from the intake manifold where they emerge from the T joint.

Having thus described my invention I desire to secure by Letters Patent and claim:

In a fueling system comprising a float chamber, in which a float controls the level of the liquid therein, mounted with the lower end thereof below the level of the bottom of the fuel supply tank; screens made of woven metal, carried in said float chamber with one portion thereof submerged in fuel at all times; pipes connecting said screens with a carburetion device one of which pipes is of smaller diameter to be used as an idling pipe; and another pipe completely surrounding the first mentioned pipes carrying preheated air over said pipes and discharging it within the float chamber where it is used to mix with the gas vapors and carried through the first mentioned pipes to the carburetion device and thence to the engine.

In testimony whereof I have affixed my signature.

THEODORE BOSSARD.